US010486917B1

(12) United States Patent
Vulpetti

(10) Patent No.: US 10,486,917 B1
(45) Date of Patent: Nov. 26, 2019

(54) CONVEYOR-BELT PLATFORM DIVERTER

(71) Applicant: Laitram, L.L.C., Harahan, LA (US)

(72) Inventor: Matthew Vulpetti, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 16/032,920

(22) Filed: Jul. 11, 2018

(51) Int. Cl.
*B65G 47/94* (2006.01)
*B65G 47/24* (2006.01)
*B65G 17/30* (2006.01)

(52) U.S. Cl.
CPC ............ *B65G 47/94* (2013.01); *B65G 17/30* (2013.01); *B65G 47/24* (2013.01); *B65G 2207/36* (2013.01); *B65G 2811/0621* (2013.01); *B65G 2812/02049* (2013.01); *B65G 2812/02069* (2013.01); *B65G 2812/02534* (2013.01)

(58) Field of Classification Search
CPC ...... B65G 47/94; B65G 47/24; B65G 47/841; B65G 25/08; B65G 47/10; B65G 47/96; B65G 47/844; B65G 47/68; B65G 47/00
USPC ............ 198/449, 454, 440, 448, 458, 890, 198/890.01, 805, 370.02; 700/230
See application file for complete search history.

(56) References Cited

U.S. PATENT DOCUMENTS

| 3,167,171 | A | 1/1965 | Harmon et al. |
| 3,731,782 | A | 5/1973 | DelRosso |
| 4,319,676 | A | 3/1982 | Turnbrough |
| 4,993,535 | A | 2/1991 | Scata |
| 5,921,378 | A | 7/1999 | Bonnet |
| 6,705,452 | B2 | 3/2004 | Greve et al. |
| 9,302,855 | B2 | 4/2016 | Guernsey et al. |
| 9,371,194 | B2 | 6/2016 | Ragan |

FOREIGN PATENT DOCUMENTS

| JP | 2000-118689 A | 4/2000 |
| JP | 2004-026490 A | 1/2004 |

OTHER PUBLICATIONS

International Search Report and Written Opinion of the International Searching Authority, PCT/US2019/036659, dated Oct. 1, 2019, Korean Intellectual Property Office, Republic of Korea.

*Primary Examiner* — Gene O Crawford
*Assistant Examiner* — Lester III Rushin
(74) *Attorney, Agent, or Firm* — James T. Cronvich

(57) ABSTRACT

A belt conveyor having a platform that is movable from a retracted position recessed into a conveyor belt's top surface and an extended position above the top surface. The platform translates across the width of the belt in a slot to carry articles across the width of the belt. Guides in the conveyor below the belt have cam surfaces that raise and lower the carrier and translate it across the belt. The carrier may include a cam-actuated lever to flip articles on the belt or off a side of the belt.

17 Claims, 5 Drawing Sheets

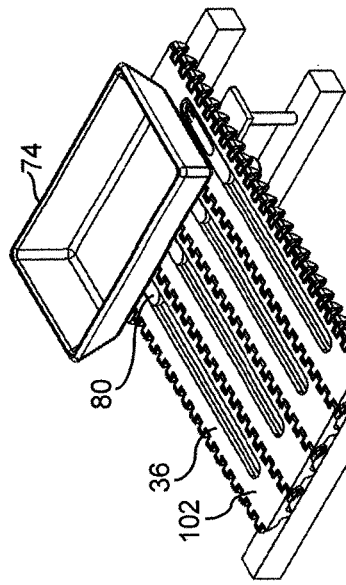
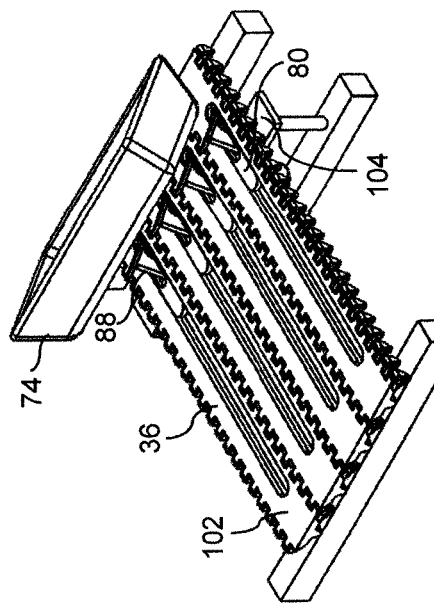
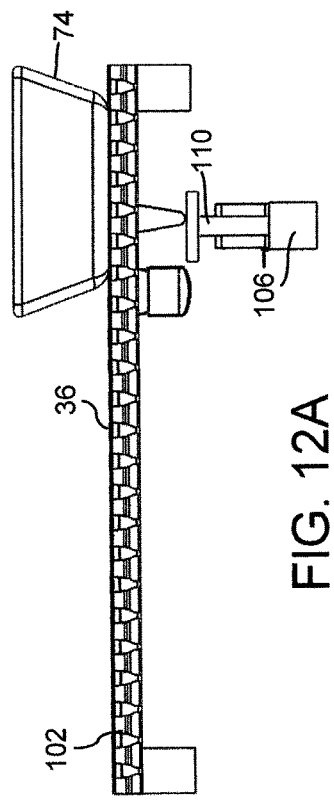
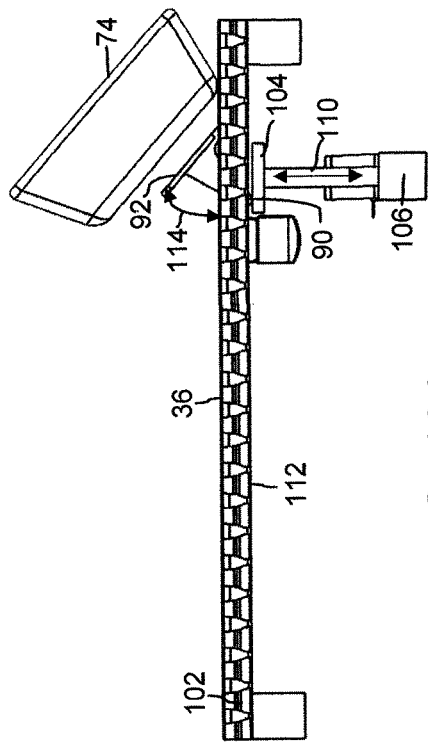

CONVEYOR-BELT PLATFORM DIVERTER

BACKGROUND

The invention relates generally to power-driven conveyors and in particular to article-diverting belt conveyors.

Diverting conveyors, such as shoe sorters, are used to divert articles across the width of a conveyor as the conveyor transports the articles in a conveying direction. Typical shoe sorters include article-pushing elements called shoes that are driven laterally across the conveyor to push articles off one or both sides of the conveyor to one or more discharges. Slat conveyors and modular conveyor belts are used as platforms for the shoes, which ride in tracks extending across the widths of the slats or belt modules. The shoes are conventionally block-shaped with depending structural elements that keep the shoes in the tracks and serve as cam followers that extend below to be guided by carryway guides that control the lateral positions of the shoes. In applications where the friction between the bottoms of heavy conveyed articles and the top surface of the conveyor is high, pusher-type shoes can damage the contact sides of the articles or cause their bottoms to be marred. Or if the shoe's track does not extend close enough to a side of the conveyor belt, small articles meant to be sorted off the side can be stranded.

SUMMARY

One version of a conveyor belt embodying features of the invention comprises a top surface and an opposite bottom surface and a first side and an opposite second side defining the belt's width. An elongated slot extends across a portion of the width of the belt and has a top opening at the top surface and a bottom opening at the bottom surface. The top opening is wider than the bottom opening to form a ledge recessed inward of the top surface. A carrier includes a platform seatable on the ledge, a first cam follower below the bottom surface, and a neck extending through the elongated slot to connect to the platform and to the first cam follower. The neck is long enough to allow the carrier to move between a raised position in which the platform protrudes above the top surface and a lowered position in which the platform does not protrude above the top surface.

One version of a conveyor embodying features of the invention comprises a conveyor belt and guides supported by a conveyor frame beneath an upper run of the conveyor belt. The conveyor belt includes a top surface and an opposite bottom surface and a first side and an opposite second side defining the belt's width. Elongated slots extend across the width of the conveyor belt at spaced apart locations along the length of the conveyor belt in a direction of belt travel. A retractable carrier is received in each of the elongated slots. The carrier includes a platform at the top surface, a first cam follower below the bottom surface, and a neck extending through the elongated slot to connect to the platform and the first cam follower. The guides include a vertical guide surface that extends obliquely across the upper run to contact the first cam followers as the conveyor belt advances upstream to downstream in the direction of belt travel to move the carriers along their slots and a ramp transverse to the vertical guide surface at an end of the guide up which the first cam followers ride as they move along their slots to raise the platforms to a raised position in which the platforms protrude above the top surface of the conveyor belt.

BRIEF DESCRIPTION OF THE DRAWINGS

FIGS. 12A and 12B are front elevation and isometric views of a conveyor as in FIG. 11 with the levers not actuated.

FIGS. 13A and 13B are front elevation and isometric views as in FIGS. 12A and 12B with the levers actuated.

DETAILED DESCRIPTION

Figure 1:
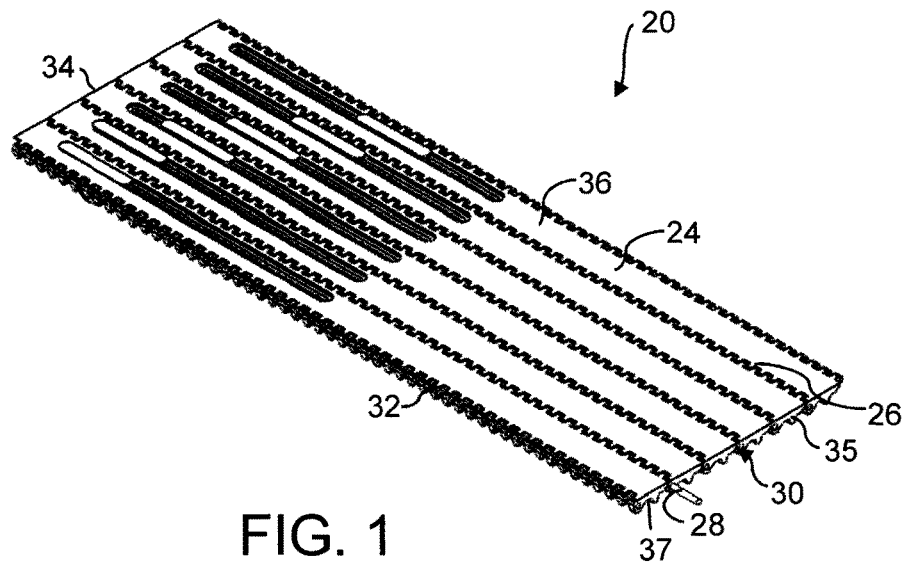
FIG. 1 is an isometric view of a portion of a modular conveyor belt embodying features of the invention.
Figure 2:
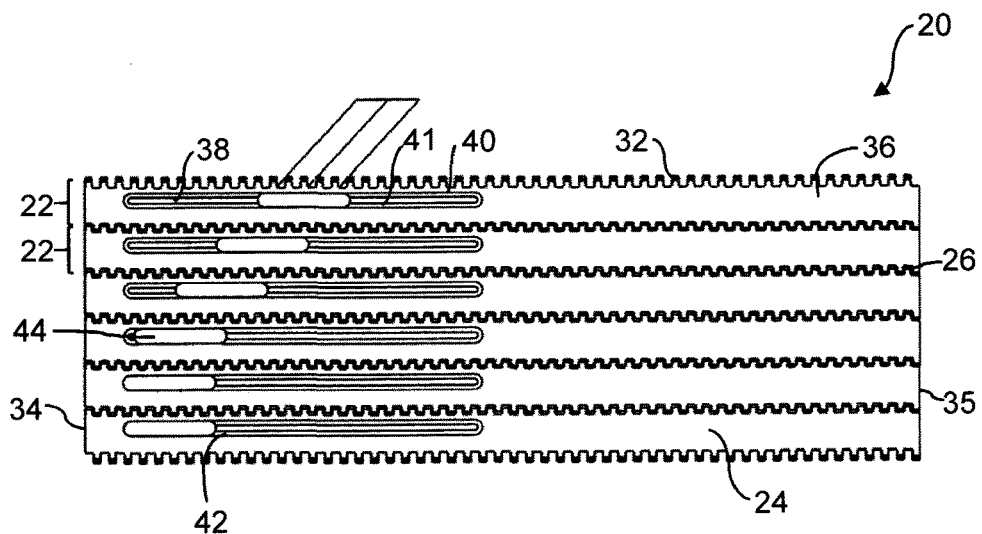
FIG. 2 is a top plan view of the conveyor belt of FIG. 1 and a guide below.

A portion of a conveyor belt embodying features of the invention is shown in FIGS. 1 and 2. The conveyor belt 20 is constructed of a series of rows 22 of belt modules 24 linked together at hinge joints 26 by hinge rods 28 extending through lateral passageways 30 formed by interleaved hinge elements 32 along the ends of each module. The conveyor belt 20 extends in width from a first side 34 to an opposite second side 35 and in thickness from a top surface 36 to a bottom surface 37. Elongated slots 38 extend through the thickness of the belt modules 24 across their width. In this example the slots 38 extend across only a portion of the entire width of the module 24. The conveyor belt 20 in this example has a slot 38 in each belt row 22, but a belt could be built of a mixture of rows with slots and rows without slots. The slots 38 have top and bottom openings 40, 41. The top opening 40, which opens onto the top surface 36 of the conveyor belt 20, is wider than the bottom opening 40, which opens onto the bottom surface 37. In that way a ledge 42 recessed inward of the top surface 36 is formed. A carrier 44 rides across the width of the conveyor belt on the ledge 42 in the slot 38.

Figure 3:
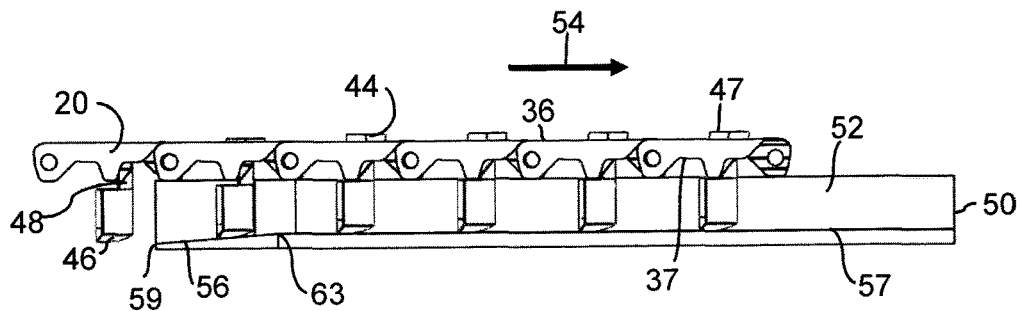
FIG. 3 is a side elevation view of the conveyor belt and guide of FIG. 2.

As shown in FIG. 3, the carrier 44 has a depending cam follower 46 below the bottom surface 37 of the conveyor belt 20. The carrier 44 has a top platform 47 at the top surface 36 of the conveyor belt 20. A narrow neck 48 extending through the opening 38 connects at one end to the platform 47 and at the other end to the cam follower 46. A guide 50 supported beneath an upper run of the conveyor belt 20 in a conveyor frame has a vertical guide surface 52 that extends across the width of the conveyor. The vertical guide surface 52 serves as a cam surface along which the cam follower 46 rides as the motor-driven conveyor belt advances in a direction of belt travel 54. A ramp 56 transverse to the vertical guide surface 52 also serves as a cam surface against the bottom of the cam follower 46 to raise the carrier 44 to a position in which the platform 47 protrudes above the top surface 36 of the belt 20. The ramp 56 rises from a lower end 59 to a higher end 63 at a horizontal cam surface 57 that maintains the carrier in the raised position.

Figure 4:
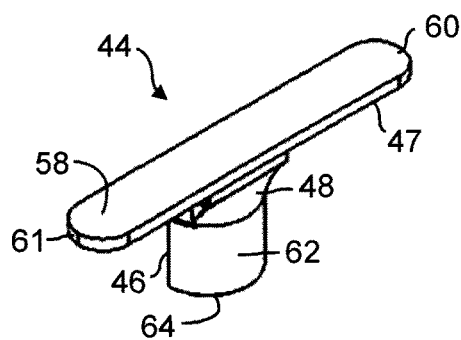
FIG. 4 is an isometric view of a carrier for a conveyor belt as in FIG. 1.

One version of a carrier 44 is shown in FIG. 4. The top platform 47 has a flat top face 58 and rounded ends 60, 61. The neck 48 connects at one end to the platform 47 and at the other end to the cam follower 46. The neck 48 is narrow enough to fit in the slot in the conveyor belt 20 and long enough to provide the carrier 44 with a vertical range of motion from a raised position in which the platform 47 protrudes above the top surface 36 of the belt, as on the right side of FIG. 3, to a lowered position in which the platform sits on the ledge, i.e., flush with or recessed below the top surface 36 without protruding. The cam follower 46 has a curved outer vertical face 62 that rides along the vertical guide surface 52 and a curved bottom face 64 that rides on the ramp 56 and the horizontal cam surface 57.

Figure 5:
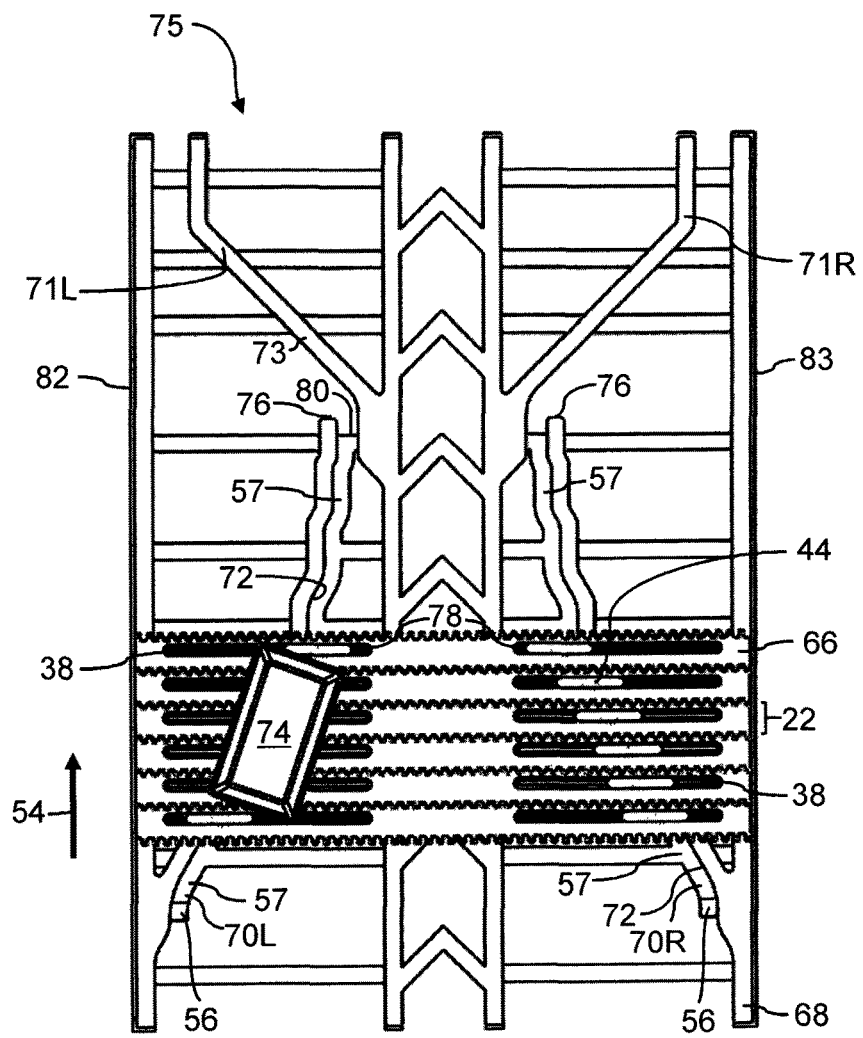
FIG. 5 is a top plan view of a portion of a conveyor carryway guide supporting a portion of a conveyor belt having two sets of carriers as in FIG. 4 in each belt row.

FIG. 5 shows a conveyor 75 with a portion of a conveyor belt 66 having two slots 38—one on each half of the belt—in each belt row 22. The carriers 44 received in the slots 38 are elongated along the width of the belt 66. A conveyor frame 68 supports the belt 66 and upstream and downstream guides 70R, 70L, 71R, 71L in an upper carryway run. The two upstream guides 70R, 70L have vertical guide surfaces 72 arranged obliquely across the width of the conveyor 75 to guide the carriers 44 toward the widthwise middle of the belt as the belt 20 advances in the direction of belt travel 54. The ramp 56 at the upstream ends of the upstream guides 70L, 70R raises the carriers 44 to the raised position as their cam followers ride up the ramp. The horizontal cam surface 57 extending horizontally from the top of the ramp 56 maintains the carriers in the raised position as they advance downstream. An article, such as a tray 74, sitting atop the carriers 44 is translated across the top surface 36 of the belt 66 by the raised carriers. All the carriers 44, upon passing the downstream ends 76 of the upstream guides 70L, 70R, are positioned at the inner ends 78 of the slots 38. When the carriers 44 reach the ends 80 of horizontal cam surfaces 57, they drop to the lowered position. The cam followers of the lowered carriers 44 then encounter the downstream guides 71L, 71R, which translate the lowered carriers back to starting positions proximate to the outer sides 82, 83 of the conveyor 75. Thus, the downstream guides 71L, 71R with vertical surfaces 73, but without ramps and horizontal cam surfaces, keep the carriers lowered and align their cam followers laterally with the positions of the ramps 56 on the upstream guides 70L, 70R for proper engagement of the cam followers with the ramps in the next belt cycle.

Figure 6:
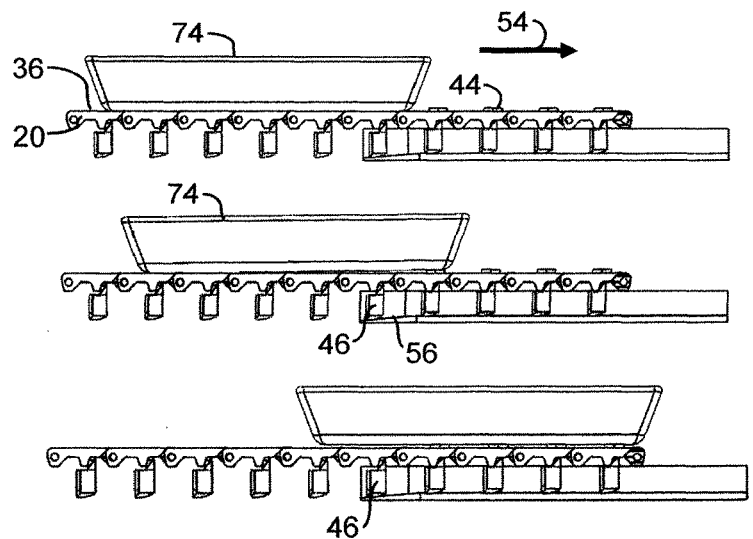
FIG. 6 is a trio of side elevation views depicting the transfer of a tray step by step onto raised carriers in a conveyor as in FIG. 5.

FIG. 6 illustrates cam followers 46 of carriers 44 engaging a guide 50 as the belt 20 advances in the direction of belt travel 54 to move a tray 74 across the width of the belt (out of the page in FIG. 6). In the top view the tray 74 sits directly on the top surface 36 of the belt 20 because the carriers 44 are lowered with their platforms flush with or recessed below the top surface. As the cam followers 46 on the carriers 44 supporting the leading end of the tray 74 ride up the ramp 56, they lift the front end of the tray 74 above the top surface 36 of the belt as in the middle view of FIG. 6. And as the cam followers 46 on the leading carriers 46 engage the vertical guide surface 52, the carriers start diverting the leading end of the tray 74 in the direction of the vertical guide surface (out of the page in FIG. 6). Once the trailing cam followers 46 of the carriers 44 supporting the tray 74 encounter the ramp 56 as in the bottom view of FIG. 6, the entire tray is supported above the top surface 36 on the raised carriers. The vertical guide surfaces 52 acting on the sides of the trailing cam followers 46 urge the trailing end of the tray laterally toward alignment with the leading end in the direction of belt travel 54.

Figure 7:
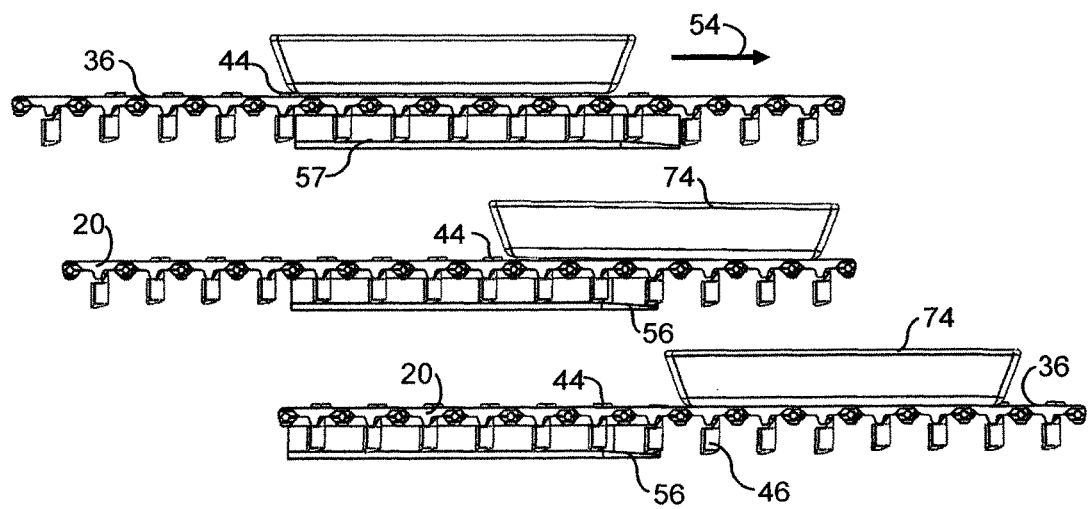
FIG. 7 is a trio of side elevation views depicting the transfer of a tray step by step off raised carriers in a conveyor as in FIG. 5.

FIG. 7 shows the gentle release of a diverted tray 74 from atop raised carriers 44 riding on a horizontal cam surface 57. In the top view the carriers 44 supporting the tray 74 are all raised above the belt's top surface 36. In the middle view the carriers 44 supporting the trailing end of the tray 74 are raised. The leading end of the tray 74 is supported on the top surface 36 of the belt 20 because the carriers 44 under the leading end are in their lowered position after riding down the ramp 56. In the bottom view all the carriers 44 under the tray 74 are lowered, and the tray sits directly on the top surface 36 of the belt 20 to be conveyed in the direction of belt travel 54.

Figure 8:
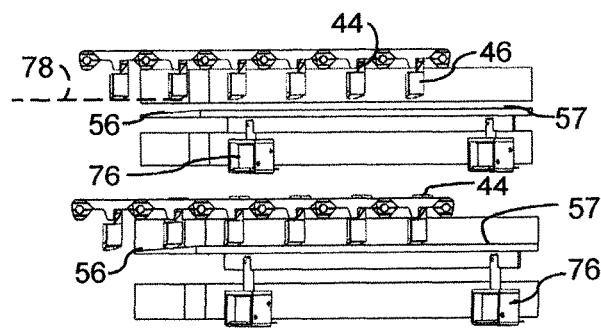
FIG. 8 is a pair of front elevation views depicting a ramp movable between a lowered position out of contact with a carrier's cam follower in a conveyor as in FIG. 5 and a raised position in contact with the cam follower.

FIG. 8 shows a retractable ramp 56 and horizontal guide surface 57 selectively raised and lowered by actuators 76, such as linear actuators. In the upper view the ramp 56 and horizontal cam surface 57 are shown in a lowered, or retracted, position below the lowest level 78 of the carriers' cam followers 46. In the retracted position of the ramp 65 and the horizontal cam surface 57, the carriers 44 are maintained in their lowered positions out of contact with conveyed articles. In the lower view the actuators 76 are shown lifting the ramp 56 and horizontal cam surface 57 to the extended position providing a cam surface on which the cam followers 46 can ride to raise the carriers 44 to the raised position.

Figure 9:
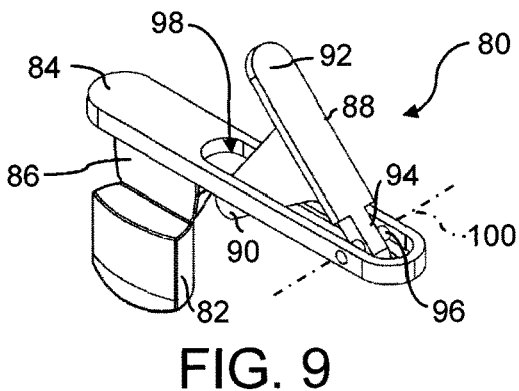
FIG. 9 is an isometric view of another version of a carrier usable in a conveyor belt as in FIG. 1 and having a lever.

Another version of a carrier is shown in FIG. 9. Like the carrier 44 of FIG. 4, the carrier 80 has a cam follower 82, a top platform 84, and a narrow connecting neck 86. And it also has a lever 88 pivotally connected to the platform 84. The lever 88 has a second cam follower 90 extending downward like a keel from a flipper plate 92. The flipper plate 92 extends from a pivot shank 94 at one end. The shank 94 has a pivot formed by an eyelet that receives a pivot pin 96 whose ends are retained in the platform 84. As one alternative, the pivot can be realized by trunnions extending from the sides of the pivot shank 94 to holes in the platform 84. When retracted, the lever is received in an opening 98 through the platform 84, and the top surface of the flipper plate 92 is flush with the top surface of the platform 84. The main cam follower 82 of the carrier 80 is offset from the second cam follower 90 in directions both parallel and perpendicular to the direction of the lever's pivot axis 100 so that the two cam followers can be actuated independently. In this example the pivot is situated close to an end of the platform 84.

Figure 10:
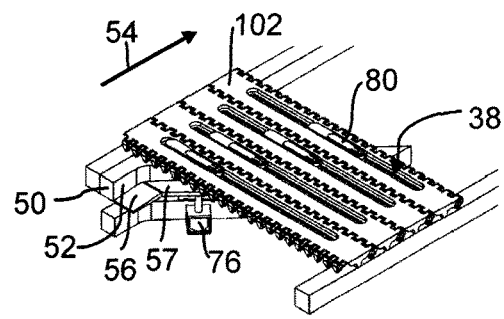
FIG. 10 is an isometric view of a conveyor and a portion of a conveyor belt with a carrier as in FIG. 9 and carryway guides to divert the carrier.
Figure 11:
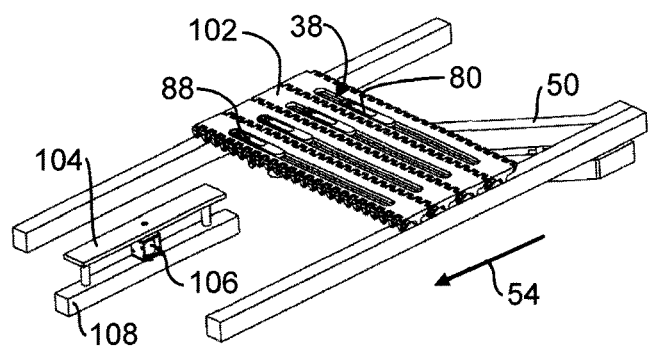
FIG. 11 is an isometric view from the opposite side as the view in FIG. 10 showing an actuator for the lever of FIG. 9.

As shown in FIGS. 10 and 11, the carriers 80 ride in elongated slots 38 in a conveyor belt 102. The vertical guide surface 52 of the guide 50 pushes the carriers 80 across the width of the belt 102 as it advances in the direction of belt travel 54. The ramp 56 and the horizontal cam surface 57 raise the carriers 80 above the belt's top surface 36 to support and carry conveyed articles when the actuator 76 is energized to lift the ramp and the horizontal guide surface into contact with the bottom of the carriers' cam followers. When deactuated by the actuator 76, the ramp 56 and the horizontal guide surface 57 are lowered out of contact with the carriers' cam followers. As shown in FIG. 11, a cam surface 104 elongated in the direction of belt travel 54 is positioned downstream of the exit from the guide 50. The guide 50 aligns the cam follower of the lever 88 laterally across the width of the conveyor with the cam surface 104. An actuator 106 supported in the conveyor frame 108 selectively moves the cam surface 104 into or out of contact with the levers' cam followers.

FIGS. 12A and 12B show the effect of retracted levers on a tray 74 supported on the top surface 36 of the belt 102 when the carriers 80 are also lowered. The piston 110 of the lever's actuator 106 is retracted to put the levers in the retracted position allowing the tray to continue to translate laterally to a position near a side of the belt 102. In FIGS. 13A and 13B the actuator 106 is shown with its piston 110 extended pushing the cam surface 104 up toward the bottom 112 of the belt 102 and against the cam followers 90 of the levers 88. Engagement of the cam followers 90 with the cam surface 104 pivots the levers 88 so that their flipper plates assume an angle 114 with the top surface 36 of the belt 102. In the extended position, the levers 88 flip the tray 74 off the near side of the belt.

Embodiments other than those disclosed in detail are possible. For example, the cam followers can slide along the cam surfaces as shown or can be roller cams with rollers at their ends to roll rather than slide on the cam surfaces. As another example, the lever actuator can be positioned away from the sides of the conveyor to flip articles on the conveyor belt. For example, it may be desirable to flip a box to expose a side with indicia to a scanner.

What is claimed is:

1. A conveyor belt comprising:
    a top surface and an opposite bottom surface and a first side and an opposite second side defining the width of the conveyor belt;
    an elongated slot extending across a portion of the width of the belt and having a top opening at the top surface and a bottom opening at the bottom surface;
    wherein the top opening is wider than the bottom opening to form a ledge recessed inward of the top surface;
    a carrier including:
        a platform seatable on the ledge;
        a first cam follower below the bottom surface;
        a neck extending through the elongated slot to connect to the platform and to the first cam follower;
    wherein the neck is long enough to allow the carrier to move between a raised position in which the platform protrudes above the top surface and a lowered position in which the platform does not protrude above the top surface.

2. A conveyor belt as claimed in claim 1 wherein the platform is received on the ledge when the carrier is in the lowered position.

3. A conveyor belt as claimed in claim 1 wherein the platform has a flat top flush with the top surface of the conveyor belt when the carrier is in the lowered position.

4. A conveyor belt as claimed in claim 1 wherein the platform is elongated along the elongated slot.

5. A conveyor belt as claimed in claim 1 comprising a series of rows of belt modules hingedly linked together at hinge joints between adjacent rows wherein a plurality of the rows include the elongated slots formed between the hinge joints and the carriers received in the elongated slots.

6. A conveyor belt as claimed in claim 5 wherein each of the plurality of rows that include carriers have two elongated slots spaced apart across the width of the conveyor belt and a carrier in each of the elongated slots.

7. A conveyor belt as claimed in claim 1 wherein the carrier includes a lever pivotable between a retracted position recessed into the platform and an extended position protruding upward of the platform at an angle relative to the top surface of the conveyor belt.

8. A conveyor belt as claimed in claim 7 wherein the lever has a pivot pivotally connected to the carrier at an end of the platform.

9. A conveyor belt as claimed in claim 7 wherein the lever has a second cam follower extending below the bottom surface of the conveyor belt and offset from the first cam follower in a longitudinal direction of the conveyor belt.

10. A conveyor belt as claimed in claim 7 wherein the platform has an opening sized to receive the lever in the retracted position flush with the top surface of the conveyor belt when the carrier is in the lowered position.

11. A conveyor comprising:
    a conveyor belt including:
        a top surface and an opposite bottom surface and a first side and an opposite second side defining the width of the conveyor belt;
        a plurality of elongated slots extending across the width of the conveyor belt at spaced apart locations along the length of the conveyor belt in a direction of belt travel;
        a retractable carrier received in each of the elongated slots, wherein the carrier includes a platform at the top surface, a first cam follower below the bottom surface, and a neck extending through the elongated slot to connect to the platform and the first cam follower;
    a conveyor frame;
    guides supported by the conveyor frame beneath an upper run of the conveyor belt, wherein the guides include:
        a vertical guide surface extending obliquely across the upper run to contact the first cam followers as the conveyor belt advances upstream to downstream in the direction of belt travel to move the carriers along their slots;
        a ramp transverse to the vertical guide surface at an end of the guide up which the first cam followers ride as they move along their slots to raise the platforms to a raised position in which the platforms protrude above the top surface of the conveyor belt.

12. A conveyor as claimed in claim 11 wherein the guides include a second ramp at an opposite end down which the cam followers ride as they move along their slots to lower the platforms to a lowered position in which the platforms are retracted into the elongated slots.

13. A conveyor as claimed in claim 11 wherein the ramps are proximate the first or second sides of the conveyor belt.

14. A conveyor as claimed in claim 11 comprising one or more actuators coupled to the ramps to move the ramps from a first position to receive the cam followers to a second position below the level of the cam followers.

15. A conveyor as claimed in claim 11 wherein the carrier includes a lever pivotable between a retracted position recessed into the platform and an extended position protruding upward of the platform at an angle relative to the top surface of the conveyor belt.

16. A conveyor as claimed in claim 15 wherein the lever has a second cam follower extending below the bottom surface of the conveyor belt and wherein the conveyor comprises:
    a cam surface elongated in the direction of belt travel and supported by the conveyor frame in a position across the width of the conveyor belt in line with the second cam follower when the carrier is at an end of the elongated slot; and
    an actuator selectively moving the cam surface into or out of contact with the second cam follower to pivot the lever between the extended and retracted positions.

17. A conveyor as claimed in claim 16 wherein the end of the elongated slot is close enough to the first or second side of the conveyor belt so that the pivoting of the lever from the retracted position to the extended position flips articles supported on the top surface of the conveyor belt above the carrier at the end of the elongated slot off the first or second side of the conveyor belt.

* * * * *